June 29, 1965 H. A. CAMPBELL, JR., ETAL 3,191,881

MAGNETIC TAPE FEED ASSEMBLY FOR TAPE RECORDERS

Filed Jan. 18, 1962

3 Sheets-Sheet 1

H Albert Campbell, Jr.
Harold R. Burt
INVENTORS

BY Oliver D. Olson
Agent

June 29, 1965 H. A. CAMPBELL, JR., ETAL 3,191,881

MAGNETIC TAPE FEED ASSEMBLY FOR TAPE RECORDERS

Filed Jan. 18, 1962 3 Sheets-Sheet 2

H Albert Campbell, Jr.
Harold R. Burt
INVENTORS

BY Oliver D. Olson
Agent

H Albert Campbell, Jr.
Harold R. Burt
INVENTORS
BY Oliver D. Olson
Agent

United States Patent Office 3,191,881

Patented June 29, 1965

3,191,881

MAGNETIC TAPE FEED ASSEMBLY FOR TAPE RECORDERS

H Albert Campbell, Jr., Portland, and Harold R. Burt, Beaverton, Oreg., assignors, by mesne assignments, to K.W.F. Industries, Inc., a corporation of Washington Filed Jan. 18, 1962, Ser. No. 167,096

9 Claims. (Cl. 242—55.13)

This invention relates to magnetic tape recorders, and more particularly to a novel magnetic tape cartridge and feed assembly for tape recorders.

It is the principal object of the present invention to provide a magnetic tape cartridge and feed assembly which affords connection of a magnetic tape from a supply spool to a take-up spool, with maximum speed and facility.

Another important object of the present invention is to provide a magnetic tape cartridge in which means is incorporated for insuring against binding of the tape therein during winding of the tape thereon, and affords minimum frictional resistance to the winding and unwinding of the tape.

A further important object of this invention is the provision of a magnetic tape take-up spool which functions to provide positive and precise indication when the first loop of tape is wound thereon or unwound therefrom.

A still further important object of this invention is the provision of a magnetic tape cartridge and feed assembly of simplified construction for economical manufacture.

The foregoing and other objects and advantages of this invention will appear from the following detailed description, taken in connection with the accompanying drawings in which.

Figures 1, 2:
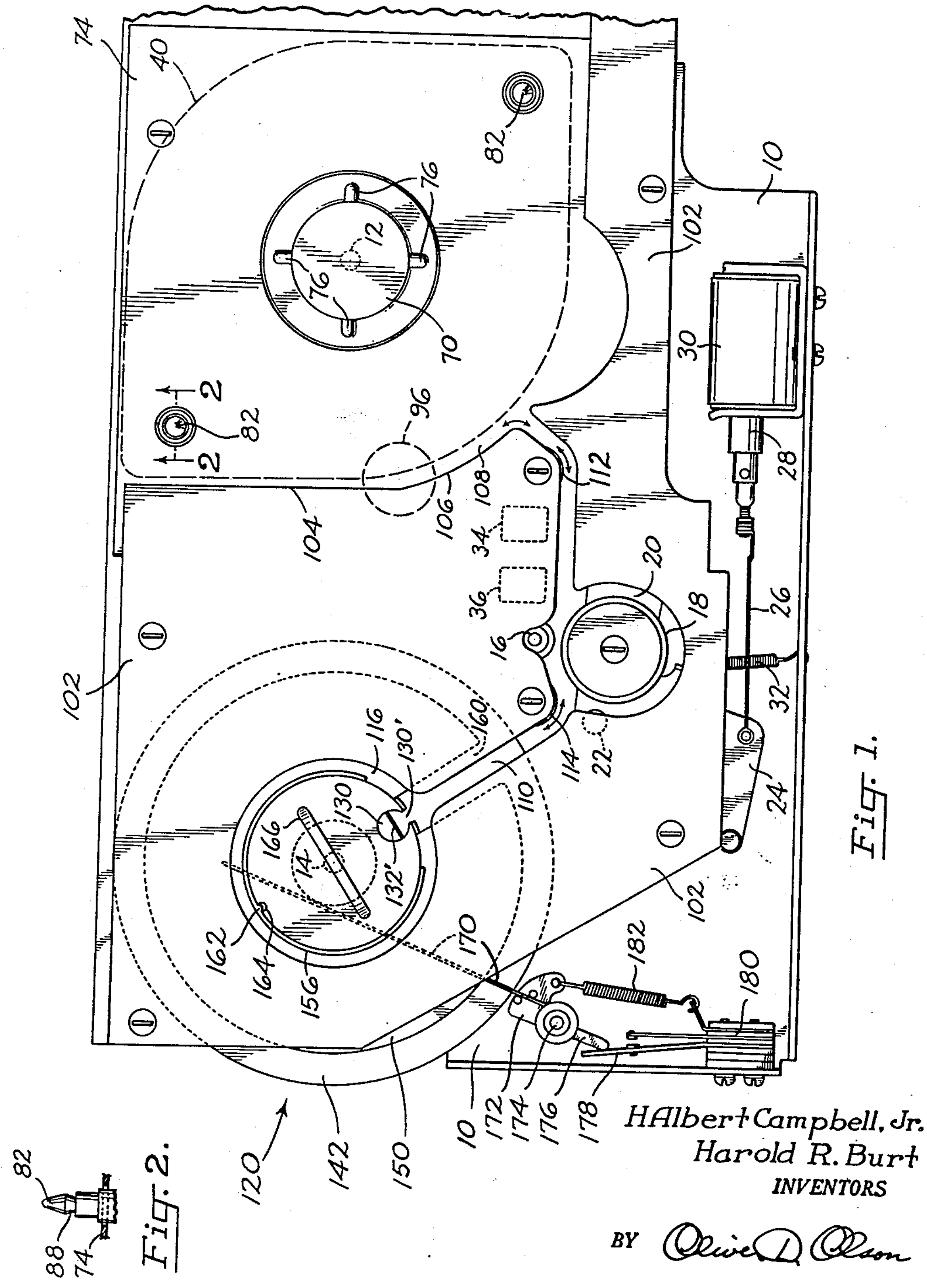
FIG. 1 is a fragmentary plan view of a tape recorder showing a magnetic tape cartridge and feed assembly embodying the features of the present invention.
FIG. 2 is a fragmentary sectional view taken along the line 2—2 in FIG. 1.

Referring first to FIG. 1 of the drawings, the tape deck assembly illustrated therein is supported on a main base plate 10 which, as will be understood, is in turn suitably supported in the instrument cabinet of a magnetic tape recorder. The latter may be of the general home or office type recording instrument, or it may be of the type employed for the automatic answering of telephone calls.

Projecting freely through the main plate 10 are the supply spool rewind drive shaft 12, the take-up spool drive shaft 14, and the tape drive capstan 16. The pressure roll 18 associated with the capstan is mounted rotatably on one arm 20 of a bell crank lever which is supported for pivotal movement above the main plate by means of the pivot pin 22. The other arm 24 of the bell crank lever is connected pivotally by the wire rod 26 to the armature 28 of an electric solenoid 30. Activation of the solenoid retracts its armature and pivots the bell crank lever in the direction to move the pressure roll into frictional engagement with the capstan, against the biasing pressure of the spring 32 which normally urges the pressure roll away from the capstan.

The drive mechanism (not shown) associated with the shafts 12, 14, 16 functions in well-known manner to drive the take-up shaft 14 in the direction to wind a magnetic tape on a take-up spool. During this operation the magnetic tape is unwound from its supply spool mounted on the now idling rewind shaft 12, and is drawn past the conventional erase head 34 and record head 36 supported on the main plate. During this forward movement of the tape the latter is pressed against the rotating capstan by the pressure roll, thus placing the tape firmly against the record head for purposes of recording or playing back a message on the tape.

Driving of the rewind shaft 12 serves to rotate the supply spool mounted thereon in the direction to rewind the tape from the take-up spool mounted on the now idling take-up drive shaft 14. During rewinding of the tape the latter is moved out of engagement with the capstan by deactivation of the solenoid 30 and consequent retraction of the pressure roll 18.

Referring now particularly to FIGS. 3–7, the tape cartridge 40 of the present invention comprises a hollow container preferably formed of substantially identical lateral half sections for economy of manufacture by the molding of thermoplastic resin. Each half section includes an end wall 42 and a peripheral side wall 44, and the two halves are arranged with their side wall edges abutting to form the hollow container. The halves are secured together by means of the screws 46, each of which extends through an opening in a different one of the halves and is secured in a registering tapped opening in the other half. Alternatively, or additionally, the two halves may be secured together along their abutting side edges by means of adhesive.

The side wall of each half of the container is provided with a central opening 48 for receiving freely therethrough the supply spool for a magnetic tape 50. The spool includes an end wall 52 and a circular side wall 54 projecting therefrom, and the latter is reduced in diameter adjacent its opposite ends for reception in the openings 48 of the end walls of the container halves. The intermediate enlarged diameter of the spool side wall serves as a spool base on which to wind the magnetic tape, and a peripheral flange 56 projects from this spool adjacent one of the reduced end sections to form a base edge for the start of the winding of the magnetic tape. The inner end of the tape is secured to the spool by adhesive tape or other suitable means.

Figures 3, 4, 5, 6:
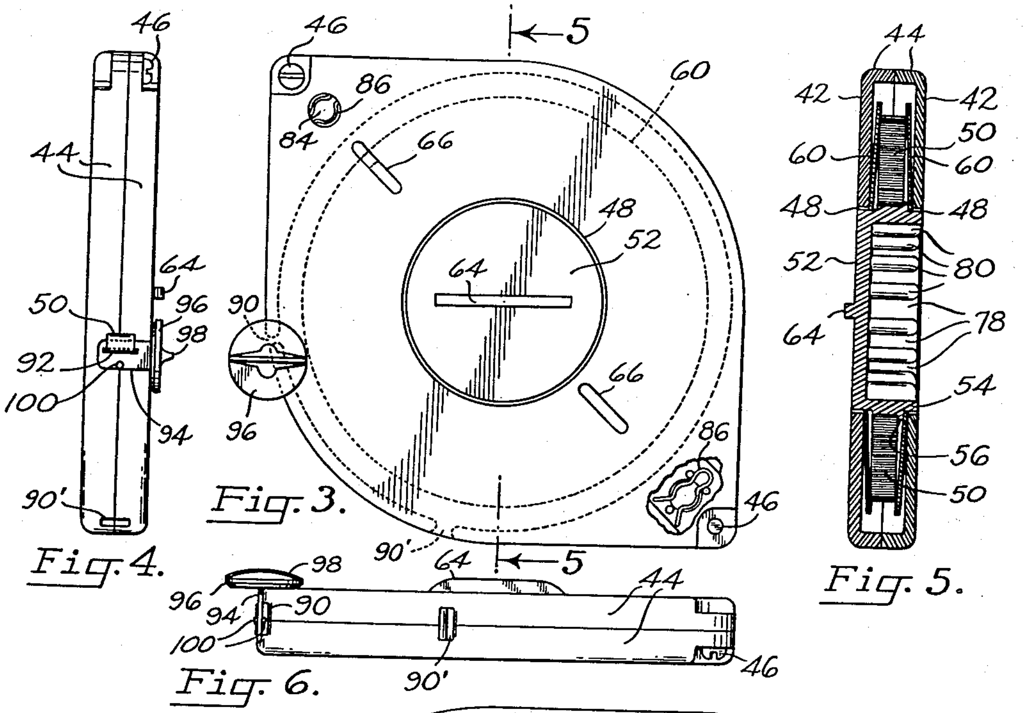
FIG. 3 is a top plan view, partially broken away to disclose features of internal construction, of a magnetic tape cartridge embodying features of this invention.
FIG. 4 is a view in side elevation as viewed from the left in FIG. 3.
FIG. 5 is a sectional view taken along the line 5—5 in FIG. 3.
FIG. 6 is a view in side elevation as viewed from the bottom in FIG. 3.
Figure 7:
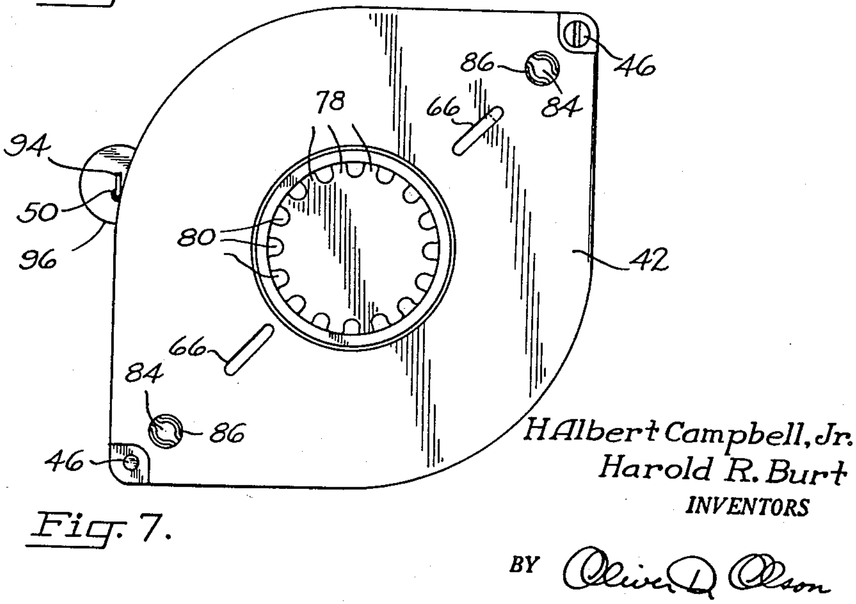
FIG. 7 is a bottom plan view of the cartridge shown in in FIG. 3.
Figures 8, 9, 10, 11, 12, 13, 14, 15, 16, 17, 18:
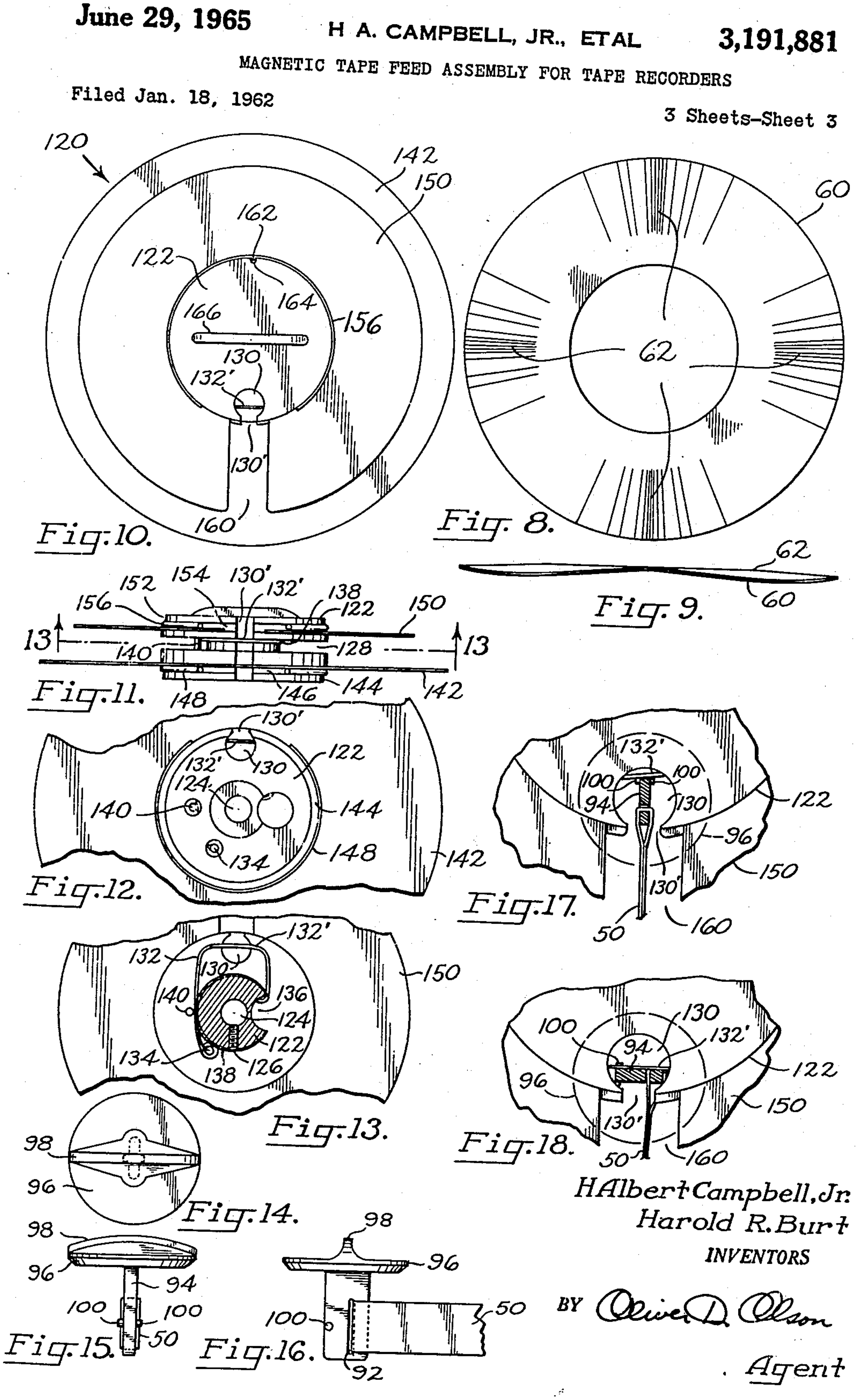
FIG. 8 is a plan view of one of the antifrictional centering discs incorporated in the cartridge.
FIG. 9 is an edge view of the disc as viewed from the bottom in FIG. 8.
FIG. 10 is a top plan view of a take-up spool embodying features of the present invention.
FIG. 11 is a side elevation of the take-up spool as viewed from the bottom in FIG. 10.
FIG. 12 is a fragmentary bottom plan view of the take-up spool, as viewed from the bottom in FIG. 11.
FIG. 13 is a fragmentary sectional view taken along the line 13—13 in FIG. 11.
FIG. 14 is a plan view of the terminal tape connector.
FIG. 15 is a view in side elevation as viewed from the bottom in FIG. 14.
FIG. 16 is a view in side elevation as viewed from the right in FIG. 15.
FIG. 17 is a fragmentary plan view, partially in section, illustrating the initial step in the attachment of the tape connector to the take-up spool.
FIG. 18 is a fragmentary plan view, partially in section, showing the final step in the attachment of the tape connector to the take-up spool.

Referring particularly to FIGS. 5, 8 and 9, means is provided for insuring substantially concentric coiling of the magnetic tape 50 upon the spool within the cartridge 40. By thus minimizing the axial thickness of the coil of tape within the cartridge, minimum frictional engagement between the side edges of the tape and the cartridge walls is assured, thus affording maximum freedom of rotation of the tape during winding and unwinding of the latter and minimizing damage to the lateral edges of the tape.

The foregoing is achieved, in the embodiment illustrated, by means of the thin, flexible annular discs 60 which are mounted one against each of the inner surfaces of the end walls 42 of the container halves. As best shown in FIGS. 8 and 9, each of these discs is creased or otherwise bent along radial lines 62 disposed at circumferentially spaced intervals, to provide the disc with a circumferential scallop or waviness. Thus, the disc is rendered resilient in its axial direction. The spacing between the discs within the housing is such that the minimum distance between them is slightly less than the width of the magnetic tape 50. Accordingly, as the tape is drawn into the cartridge and wound upon the spool, the opposing resilient discs guide the tape and cause each succeeding turn of the latter to be disposed substantially concentric with the preceding turns.

A projecting rib 64 on the end wall of the spool serves as a finger grip for rotating the spool, for winding the tape on the spool.

Symmetrically arranged windows 66 are provided in the end walls of the container halves to afford visual inspection of the tape, for example to determine the amount of tape wound on the spool. To accommodate this function, the guide discs 60 are made of transparent thermoplastic material.

Referring again to FIG. 1 of the drawings, the supply spool shaft 12 mounts a spool drive hub 70 which extends freely through an opening 72 in the spacer plate 74 mounted on the main plate 10 a spaced distance above the latter. The hub is provided with at least one radially projecting, vertically elongated rib 76, there being four such ribs spaced 90° apart in the embodiment illustrated. These ribs are proportioned and arranged to be received within appropriate ones of the plurality of radial grooves 78 (FIG. 7) provided on the supply spool by the circumferentially spaced vertically elongated ribs 80 which project radially inward from the inner surface of the circular side wall 54 of the spool. In the embodiment illustrated there are sixteen such ribs and corresponding grooves, whereby to afford mounting of the supply spool on the drive hub 70 in various positions of rotation of the latter.

The supply cartridge is secured releasably in engagement with the drive hub 70 by means of the diametrically opposed upstanding bayonet anchors 82 which are secured to the main plate 10 and extend freely through openings in the spacer plate 74. These bayonet anchors also project freely through registering pairs of openings 84 formed in the end walls 42 of the supply cartridge. Interposed between the container halves and traversing each of the pair of aligned openings therein is a resilient spring clip 86. The spring clips function to receive the bayonet anchors therethrough, spreading apart resiliently to pass the enlarged head of the anchor and then contracting to resiliently engage the reduced portion 88 of the anchor inwardly of the enlarged head. The supply cartridge thus is secured releasably to the main plate with its spool engaging the drive hub 70.

The outer end of the tape extends freely through an opening 90 in the side wall of the container. This opening preferably is formed by a pair of narrow registering notches formed in the side wall of each container half. The narrowness of the slot functions to confine the tape and prevent twisting of the latter during rewinding onto the supply spool. Because of the symmetrical construction of the two halves of the contaner, there is provided a second opening 90' in the side wall of the container. It will be understood that only one of the openings is employed.

The outer end of the tape is looped through a slot 92 in the shank 94 of a connector button (FIGS. 14–16), and the looped end of the tape is sealed by means of adhesive tape or other suitable means. In the embodiment illustrated, the shank is in the form of a flat blade and is attached at one end to the head 96. A projecting rib 98 is provided on the head for manipulating the connector button, as described more fully hereinafter. A pair of pins 100 project laterally from opposite sides of the shank, for purposes explained in detail hereinafter.

Referring again to FIG. 1 of the drawings, a secondary plate 102 is mounted on the main plate 10 a spaced distance above the latter, as by means of mounting screws and interposed spacer sleeves. This plate 102 is contoured with one edge portion 104 lying closely adjacent the mounted supply cartridge 40. An adjacent edge portion 106 of the secondary plate is spaced slightly farther from the cartridge to form a guide channel 108 therebetween, for movement of the connector button shank 94 therein. This channel communicates with an internal guide slot 110 in the secondary plate, which guide slot extends past the tape guide idler roll 112 mounted rotatably on one of the mounting screws and positioned between the main plate 10 and secondary plate, past the erase head 34 and record head 36, thence between the capstan 16 and the associated pressure roll 18, past the secondary tape guide idler roll 114 to a circular opening 116 in the secondary plate. This circular opening freely receives the upper end of the take-up spool 120 which is mounted on the take-up drive shaft 14 and is interposed between the main plate and secondary plate.

The construction of the take-up spool is best illustrated in FIGS. 10–13. The hub 122 of the spool is provided with an axial bore 124 extending upwardly from the bottom end and terminating inwardly of the top end, for receiving the take-up spool drive shaft 14. The hub is secured to the drive shaft by means of the set screw 126. The hub is reduced in diameter in the intermediate section carrying the set screw, to form an annular groove 128. This groove intercepts a longitudinal key slot 130 formed in the hub, the constricted portion 130' of the key slot opening out onto the circumference of the hub.

A resilient spring 132 is positioned in the annular groove 128 with an intermediate section 132' of the spring intercepting the key slot 130. One end of the spring is anchored on a pin 134 which is mounted on the hub and traverses the annular groove 128, and the opposite end of the spring is turned inward and slides freely in a notch 136 formed in the reduced intermediate section of the hub. Portions of the spring adjacent the opposite ends thereof are confined freely within an annular retainer groove 138 formed in the reduced section of the hub, to prevent displacement of the spring in the axial direction of the hub. A second pin 140 traverses the annular intermediate groove 128 on the outer side of the spring to confine the latter in the retainer groove 138.

By virtue of the sliding confinement of the free end of the spring, the intermediate section 132' which intercepts the key slot 130 is free to move resiliently across the key slot in the radial direction of the hub.

A bottom disc 142 is provided with a central opening which freely receives the reduced bottom end portion 144 of the hub. An annular groove 146 in this reduced hub section releasably receives a keeper ring 148 by which the disc is secured to the hub.

A top disc 150 also is provided with a central opening which freely receives the reduced top section 152 of the hub. An annular groove 154 in this top section of the hub releasably receives the keeper ring 156 which secures the top disc to the hub.

The top disc also is provided with a radial slot 160 which extends outwardly from the central opening to the circumference of the disc. This slot is aligned with the key slot 130 in the hub. To insure maintenance of this alignment, relative circumferential rotation of the hub and top disc is prevented by providing the top disc with a tab 162 which projects radially inward into the central opening and is received in a notch 164 formed in the reduced top section 152 of the hub.

The top end of the hub is provided with a projecting rib 166 which affords a finger grip for rotating the take-up spool.

The intermediate annular groove 128 in the take-up spool hub performs the additional function of providing means by which to accurately determine when the last turn of magnetic tape 50 has been unwound from the take-up spool. Referring to FIG. 1 of the drawings, a feeler rod 170 is mounted firmly at one end on one arm 172 of a bell crank lever. The lever is mounted pivotally on the main plate 10 by means of the pivot pin 174. The other arm 176 of the bell crank lever projects into engagement with the movable contact 178 of a switch 180 which is arranged in the electric circuit of the drive controller for the supply spool rewind drive shaft 12. The bell crank lever is biased resiliently by the spring 182 to rotate in the direction to open the switch contacts and to move the elongated feeler rod 170 toward the take-up spool hub and into the annular groove 128 formed in the latter.

The operation of the assembly described hereinbefore is as follows: A magnetic tape supply cartridge 40 is installed on the instrument by aligning the openings 84 with the bayonet anchors 82 and pressing downward on the cartridge to snap the spring clips 86 over the bayonet heads. In this position the cartridge spool is engaged with the rewind shaft hub 70, and the connector button is disposed with its shank 94 resting in the rearward end of the guide channel 108. By finger pressure on the connector button head 96 the connector button is moved along the channel 108 and through the guide slot 110 to the entrance of the key slot 130 in the take-up spool hub.

The shank of the connector button enters the key slot edgewise and abuts the intermediate section 132' of the spring. Forward pressure on the button causes the spring to retract (FIG. 17) to the position at which the button shank has passed through the constricted portion 130' of the key slot. The connector button then is rotated 90° (FIG. 18) in either direction to the position in which its wider dimension faces the constricted portion of the key slot. During this rotation the intermediate section 132' of the resilient spring moves radially outward into pressure contact with the adjacent, broader side of the button shank, thereby urging the latter against the wall of the key slot and preventing rotation of the button.

Moreover, the intermediate section 132' of the resilient spring now overlies the pin 100 which projects laterally from the side of the button shank engaged by the spring. Accordingly, the connector button is secured against accidental vertical displacement.

Upon actuation of the recording instrument to drive the take-up spool and thus move the magnetic tape 50 past the recording head 36 for the recording or playing out of a message on the tape, the take-up spool is caused to rotate in the clockwise direction in FIG. 1. The tape thus begins to wind up on the take-up spool between the bottom disc 142 and top disc 150, spanning the intermediate annular groove 128. Thus, the leading end of the tape engages the feeler rod 170 and moves the latter out of the groove. When the leading end of the tape reaches the 9 o'clock position in FIG. 1 the feeler rod will have been moved completely out of the groove and will rest in light contact with the tape, and its connected bell crank lever will have been rotated counterclockwise against the tension of the spring 182, to effect closure of the contacts of switch 180.

Conversely, as the magnetic tape is rewound upon the supply spool in the cartridge 40 and the terminal end of the tape on the final loop carried on the take-up spool moves from the 9 o'clock position counterclockwise toward the final position of the key slot 130 illustrated in FIG. 1, the feeler rod 170 is urged by the spring 182 radially inward into the annular groove 128. This substantial movement of the feeler rod during the small arcuate counterclockwise rotation of the take-up spool, results in substantial arcuate rotation of the bell crank lever to provide positive opening of the switch 180. This affords precise deactivation of the drive for the rewind shaft 12.

The terminal end of the tape now then may be disconnected from the take-up spool by rotating the connector button 90° in the direction opposite the direction it was rotated during the connecting operation. The thinner dimension of the button shank 94 now is aligned with the reduced section 130' of the key slot, and radially outward movement of the spring section 132' will have moved the button shank into said narrow portion of the key slot. The projecting rib 64 on the top surface of the supply spool now may be grasped by the fingers and the spool rotated in the clockwise direction in FIG. 1 to wind up the remaining length of tape. Accordingly, the connector button is drawn through the guide slot 110 to the rearward end of the channel 108, where it abuts the side edge of the cartride 40 adjacent the slot 90.

It will be apparent to those skilled in the art that various changes may be made in the details of construction described hereinbefore. For example, the keyhole slot may be L-shaped, or other desired configuration. The tape cartridge slots 90, 90' may be replaced by a single, wide slot extending therebetween, although the narrow slot described is preferred for preventing twisting of the tape. A single resilient disc 60 may be used instead of the pair illustrated, in which case the spacing between the disc and the opposite end wall 42 of the cartridge is slightly less than the width of the tape. These and other modifications may be made as desired, without departing from the spirit of this invention and the scope of the appended claims.

Having now described our invention and the manner in which it may be used, what we claim as new and desire to secure by Letters Patent is:

1. In a magnetic tape recorder, tape supply means mounted on a first drive shaft, a take-up spool spaced from the supply means and mounted on a second drive shaft means providing a substantially continuous guide slot which terminates at one end adjacent the periphery of the take-up spool and at the other end adjacent the periphery of the supply means, tape connector means having a guide portion receivable in the guide slot and an enlarged finger-engaging portion overlying the guide slot for moving the connector means manually along the slot, means on the connector means for securing a tape end thereto, and coupling means on the take-up spool releasably securing the connector means thereto.

2. The combination of claim 1 wherein the coupling means includes resilient means movable relative to an opening in the take-up spool, the tape connector means being receivable in the opening, and the resilient means being arranged to engage the connector means for securing the latter in said opening.

3. The combination of claim 1 wherein the means providing the guide slot comprises a plate having an elongated opening therein, and the tape connector means comprises a T-shaped member including said guide portion having a tape connecting shank adapted for reception in the opening, and said finger-engaging portion including a head on the shank adapted for sliding support on the plate.

4. The combination of claim 3 wherein the tape supply means includes a magnetic tape supply spool cartridge comprising a container having end walls, a tape spool member supported for rotation in the container, and means releasably mounting the cartridge adjacent the edge of said plate for connection of the spool member with said first drive shaft, the periphery of the cartridge being spaced laterally from the plate to provide therebetween a guide channel communicating with the opening in the plate for guiding the tape connector means between the cartridge and opening.

5. The combination of claim 1 wherein the tape supply means includes a magnetic tape supply spool cartridge comprising a container having end walls, a tape spool member supported for rotation in the container, a disc positioned against the inner surface of each of the end walls of the container concentric to the spool member, the discs being resilient in the axial direction of the spool member and spaced apart a distance not substantially exceeding the width of the tape for guiding the latter into substantially concentric convolutions during winding of the tape onto the spool member.

6. The combination of claim 1 wherein the take-up spool comprises a hub having an axis of rotation, and axially spaced discs on the hub defining the hub area therebetween as a spool on which to support a magnetic tape, the coupling means comprises a locking slot projecting radially inward from the periphery of the hub and extending substantially parallel to the hub axis, the outer end of the locking slot being constricted, and spring means mounted on the hub for radial movement inwardly of the constricted portion of the locking slot, and wherein the guide portion of the tape connector means has one dimension narrower than the constricted portion of the locking slot and another dimension wider than the constricted portion of the locking slot and narrower than the inner portion of the locking slot, whereby to accommodate rotation of the guide portion within the inner portion of the locking slot to a locking position at which its wider dimension spans across the restricted portion of the locking slot, the spring means resiliently engaging and urging the guide portion of the tape connector means against the wall defining the inner portion of the locking slot.

7. The combination of claim 6 including engagement means on the tape connector means adapted to engage under the spring means when in locking position to secure the connector means against displacement in the axial direction of the hub.

8. In combination, a take-up spool for a magnetic tape recorder, comprising a hub having an axis of rotation, axially spaced discs on the hub defining the hub area therebetween as a spool on which to support a magnetic tape, the hub having a locking slot projecting radially inward from the periphery and extending substantially parallel to the hub axis, the outer end of the locking slot being constricted, spring means mounted on the hub for radial movement inwardly of the constricted portion of the locking slot, and a tape connector secured to a magnetic tape and having one dimension narrower than the restricted portion of the slot and another dimension wider than the constricted portion of the slot and narrower than the inner portion of the slot, whereby to accommodate rotation of the connector within the inner portion of the slot to a locking position at which its wider dimension spans across the constricted portion of the slot, the spring means resiliently engaging and urging the connector against the wall defining the inner portion of the slot, one of the discs having a radial guide slot therein communicating at its inner end with the locking slot and at its outer end with the periphery of the disc for receiving the tape connector therethrough, and engagement means on the tape connector adapted to engage under the spring means when in locking position to secure the connector against displacement in the axial direction of the hub.

9. In combination, a take-up spool for a magnetic tape recorder, comprising a hub having an axis of rotation, axially spaced discs on the hub defining the hub area therebetween as a speel on which to support a magnetic tape, the hub having a locking slot projecting radially inward from its periphery and extending substantially parallel to the hub axis, one of the discs also having a guide slot projecting radially inward from its periphery and communicating with the locking slot in the hub, a tape connector secured to a magnetic tape and having one portion receivable through the slots and another portion overlying the slots, abutment means on the spool engageable by the tape connector, and resilient means on the spool movable relative to said slots and engageable with the tape connector for urging the latter toward said abutment means for securing the connector releasably to said spool, and engagement means on the tape connector adapted to engage under the resilient means when in locking position to secure the connector against displacement in the axial direction of the hub.

References Cited by the Examiner

UNITED STATES PATENTS

| | | | |
|---|---|---|---|
| 1,454,818 | 5/23 | Jones | 242—71.8 X |
| 1,469,018 | 9/23 | Kingsbury | 242—71.8 |
| 1,871,235 | 8/32 | Proctor et al. | 88—17 |
| 2,061,177 | 11/36 | Tasker | 242—71.2 |
| 2,131,346 | 9/38 | Fairchild | 242—74.1 X |
| 2,290,853 | 7/42 | Frankel | 242—74.2 |
| 2,640,659 | 6/53 | Biko et al. | 242—74 |
| 2,763,178 | 9/56 | Gottschalk | 242—55.12 X |
| 2,891,736 | 6/59 | Blaes | 242—55.12 |
| 2,931,591 | 4/60 | Zorn | 242—74.2 |
| 2,963,940 | 12/60 | Raabe | 242—71.2 X |
| 3,006,650 | 10/61 | Ellmore | 242—71.8 X |
| 3,022,879 | 2/62 | Heidt et al. | 197—172 |
| 3,025,011 | 3/62 | Camras | 242—55.13 |
| 3,027,110 | 3/62 | Andrews | 242—55.13 |
| 3,035,786 | 5/62 | Pieplow et al. | 242—71.1 X |

FOREIGN PATENTS

| | | |
|---|---|---|
| 1,051,541 | 9/53 | France. |

MERVIN STEIN, *Primary Examiner.*

HARRISON R. MOSELEY, *Examiner.*